US012039556B2

(12) United States Patent
Lobo et al.

(10) Patent No.: US 12,039,556 B2
(45) Date of Patent: Jul. 16, 2024

(54) METHOD AND SYSTEM FOR PROTOCOL GENERATION

(71) Applicant: Tata Consultancy Services Limited, Mumbai (IN)

(72) Inventors: Sylvan Lobo, Thane (IN); Shivani Ganwani, Thane (IN); Ravi Mahamuni, Pune (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 242 days.

(21) Appl. No.: 17/449,840

(22) Filed: Oct. 4, 2021

(65) Prior Publication Data

US 2022/0292531 A1 Sep. 15, 2022

(30) Foreign Application Priority Data

Mar. 15, 2021 (IN) .............................. 202121010973

(51) Int. Cl.
*G06Q 30/0203* (2023.01)
*G06F 16/332* (2019.01)
*G06F 40/279* (2020.01)
*G06Q 30/0201* (2023.01)

(52) U.S. Cl.
CPC ..... *G06Q 30/0203* (2013.01); *G06F 16/3322* (2019.01); *G06F 16/3329* (2019.01); *G06F 40/279* (2020.01); *G06Q 30/0201* (2013.01)

(58) Field of Classification Search
None
See application file for complete search history.

(56) References Cited

U.S. PATENT DOCUMENTS 10,095,688 B1 * 10/2018 Schilling ............. G06F 16/2455
11,328,796 B1 * 5/2022 Jain ..................... G06F 18/24
(Continued)

FOREIGN PATENT DOCUMENTS

WO WO-0026836 A2 * 5/2000 ............. G06Q 30/02

OTHER PUBLICATIONS

Christopher Ifeanyi Eke et al, A Survey of User Profiling: State-of-the-Art, Challenges, and Solutions, 2019 IEEE Access vol. 7 (Year: 2019).*

*Primary Examiner* — Jerry O'Connor
*Assistant Examiner* — Matthew H Divelbiss
(74) *Attorney, Agent, or Firm* — FINNEGAN, HENDERSON, FARABOW, GARRETT & DUNNER, LLP

(57) ABSTRACT

Manually framing questions for research and evaluation has the disadvantage that quality and effectiveness of questions of the questions depend on knowledge and expertise of subject matter expert who is framing the questions. The disclosure herein generally relates to data processing, and, more particularly, to a method and system for generating protocol for data extraction from one or more users. The system identifies sub-objectives corresponding to an identified research objective, and then generates questions to get response that matches the objective and sub-objectives. Further, a sequence is decided for the questions, and accordingly recommendations are generated. The system also assesses whether response obtained from users has reached saturation, and accordingly generates trigger to terminate data collection.

11 Claims, 8 Drawing Sheets

(56) References Cited

U.S. PATENT DOCUMENTS

| | | | |
|---|---|---|---|
| 2011/0125734 A1* | 5/2011 | Duboue | G09B 7/00 707/723 |
| 2014/0358928 A1 | 12/2014 | Alkov et al. | |
| 2015/0127565 A1* | 5/2015 | Chevalier | G06Q 10/00 705/319 |

* cited by examiner

METHOD AND SYSTEM FOR PROTOCOL GENERATION

PRIORITY CLAIM

This U.S. patent application claims priority under 35 U.S.C. § 119 to: India Application No. 202121010973, filed on Mar. 15, 2021. The entire contents of the aforementioned application are incorporated herein by reference.

TECHNICAL FIELD

The disclosure herein generally relates to data processing, and, more particularly, to a method and system for generating protocol for data extraction from one or more users.

BACKGROUND

In many fields of applications, data collection from users is an important step/process. For example, from an industry point of view, it is important to understand a user's (customer's) needs, requirements, concerns, feedback and so on, so as to perform service design efficiently to meet the requirements, and to provide quality services to the users. The user feedback helps to perform the service design such that the business can be aligned to the user requirements. The process of querying and collecting data from the users is termed as User research. Some of the approaches that may be used for the user research are user interviews, observations, focus groups (discussions), or a survey. In these approaches, the users are asked questions that match study/research objectives and user response is collected. Further, study/research is conducted based on the collected user response. There is no standard approach for generating the questions. Typically, subject matter experts decide questions matching the objectives (referred to as 'research objectives') with which the evaluation or research is being performed. One disadvantage of this approach is that quality of the questions depends highly on skills and interpretations of the subject matter experts. Different subject matter experts may give different weightages to different research objectives, and hence the questions generated may not be conclusive from the research objective point of view. Another disadvantage of the existing approaches is that in response to the questions, they may end up collecting information that is more than required for the evaluation or research being performed, from one or more users from whom the data is being collected. Collecting excessive data causes inconvenience from data storage point of view, and also requires more time, resources, and effort while performing assessment in terms of the data (answers) collected. In addition, as the users may keep providing responses to the questions, manual review to determine whether adequate data has been provided or not, is a cumbersome task.

SUMMARY

Embodiments of the present disclosure present technological improvements as solutions to one or more of the above-mentioned technical problems recognized by the inventors in conventional systems. For example, in one embodiment, a processor implemented method of protocol generation is provided. Initially, a plurality of questions are generated. Generating the plurality of questions involves the following steps. information on a) a research objective of a research being carried out, b) domain associated with the research objective, c) information on a user research method, d) a plurality of phases associated with a service under consideration, and e) a plurality of touchpoints, are collected as input, via one or more hardware processors. Further, sub-objectives matching the research objective are identified, via the one or more hardware processors. Further, a plurality of investigative suggestions are generated by determining how to investigate each of the sub-objectives, via the one or more hardware processors. Further, a plurality of measurement keywords are generated based on the plurality of investigative suggestions, via the one or more hardware processors. Further, a plurality of questions are generated using the measurement keywords and a plurality of question formats, via the one or more hardware processors. Further, recommendations are generated based on the plurality of questions and a determined sequence, via the one or more hardware processors. After generating the plurality of questions, a user research protocol is generated by combining the generated recommendation on the plurality of questions and a determined sequence with the research objective, a user selection criteria, information on the user research method, a consent form, one or more introduction scripts, one or more closing scripts, and one or more scripts about incentives.

In another aspect, a user research protocol that is generated using the plurality of questions and sequences along with other components is dynamically updated by analyzing responses provided by the users being assessed. In this process, saturation level is determined at sub protocol levels. Here, determining the saturation level at the sub-protocol level may mean assessing saturation level separately at the demographic level or at the content level. In another embodiment, the sub-protocol level may refer to individual question level. In another embodiment, the sub-protocol may mean user level or user segment level. For example, by analyzing the geographic saturation and the content saturation separately, and upon determining that the responses collected has reached the content saturation or the demographic saturation, related questions may be dropped, so as to improve focus on areas which haven't reached saturation. Similarly, when the saturation is determined at individual question level, saturation of responses collected to each question is determined, and if responses to any of the questions have been determined to have reached the set saturation levels, that particular question is dropped, so that the focus can be on questions which haven't met the saturation. By dropping one or more of the questions, the protocol is dynamically updated. In another embodiment, the system may determine saturation at a user level i.e. saturation levels are defined in terms of extent of information each user can provide as response to the questions. If response from any of the users has been identified to have met the saturation levels, then whether a user has provided data that has reached a defined saturation level. The protocol updation may also be performed by dynamically deciding to drop a set of users. For example, if response from users of a particular age group has reached the set saturation levels, then that particular group of users may be excluded from further assessments. The one or more users being dropped as part of the user research protocol updation is also referred to as 'user segments'. In an alternate embodiment, upon detecting that a current set of users are not able to provide required information, determined in terms of the content and/or geographic saturation, within a specific time limit, recommendations to add more users may be generated, wherein the change in number of users also amounts to protocol updation.

In another aspect, data collection based on the plurality of questions generated as the recommendations is terminated based on a stoppage criteria, wherein the stoppage criteria defines saturation in terms of at least one of a demographic saturation and content saturation. When at least one of the demographic saturation and the content saturation has been met, then a trigger to terminate the data collection is generated.

In another aspect, a system for protocol generation is provided. The system includes one or more hardware processors, a communication interface, and a memory storing a plurality of instructions. The plurality of instructions when executed, cause the one or more hardware processors to initially generate a plurality of questions by executing the following steps. The system collects information on a) a research objective of a research being carried out, b) domain associated with the research objective, c) information on a user research method, d) a plurality of phases associated with a service under consideration, and e) a plurality of touchpoints, as input. Further, sub-objectives matching the research objective are identified by the system. Further, a plurality of investigative suggestions are generated by determining how to investigate each of the sub-objectives, by the system. Further, the system generates a plurality of measurement keywords based on the plurality of investigative suggestions. The system then generates a plurality of questions using the measurement keywords and a plurality of question formats. Further, recommendations are generated based on the plurality of questions and a determined sequence. After generating the plurality of questions, the system generates a user research protocol by combining the generated recommendation on the plurality of questions and a determined sequence with the research objective, a user selection criteria, information on the user research method, a consent form, one or more introduction scripts, one or more closing scripts, and one or more scripts about incentives.

In yet another aspect, a non-transitory computer readable medium for protocol generation is provided. The non-transitory computer readable medium contains a plurality of instructions, which when executed, cause one or more hardware processors to perform the protocol generation by executing the following steps. Initially, a plurality of questions are generated by executing the following steps. Information on a) a research objective of a research being carried out, b) domain associated with the research objective, c) information on a user research method, d) a plurality of phases associated with a service under consideration, and e) a plurality of touchpoints, are collected as input, via one or more hardware processors. Further, sub-objectives matching the research objective are identified, via the one or more hardware processors. Further, a plurality of investigative suggestions are generated by determining how to investigate each of the sub-objectives, via the one or more hardware processors. Further, a plurality of measurement keywords are generated based on the plurality of investigative suggestions, via the one or more hardware processors. Further, a plurality of questions are generated using the measurement keywords and a plurality of question formats, via the one or more hardware processors. Further, recommendations are generated based on the plurality of questions and a determined sequence, via the one or more hardware processors. After generating the plurality of questions, a user research protocol is generated by combining the generated recommendation on the plurality of questions and a determined sequence with the research objective, a user selection criteria, information on the user research method, a consent form, one or more introduction scripts, one or more closing scripts, and one or more scripts about incentives.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
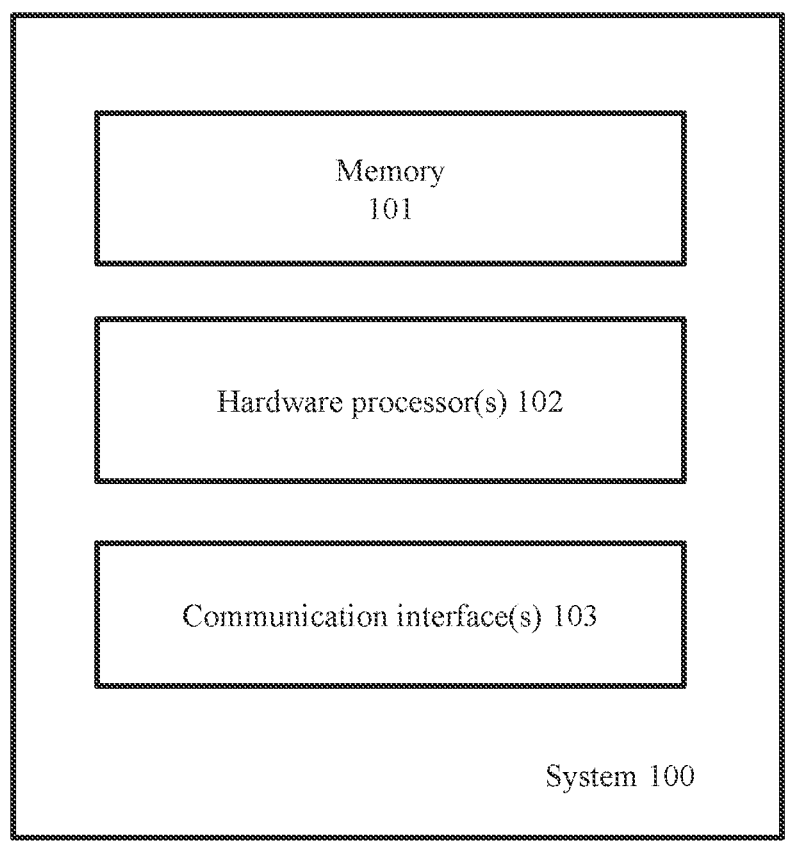
FIG. 1 illustrates an exemplary system for protocol generation, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 illustrates an exemplary system for protocol generation, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the protocol generation and data collection being performed by the system 100. The system 100 can be implemented in a variety of ways as per requirements. Various steps involved in the process of protocol generation being performed by the system 100 are depicted in FIG. 2 through FIG. 5, and are explained with reference to the hardware components depicted in FIG. 1.

Figure 2:
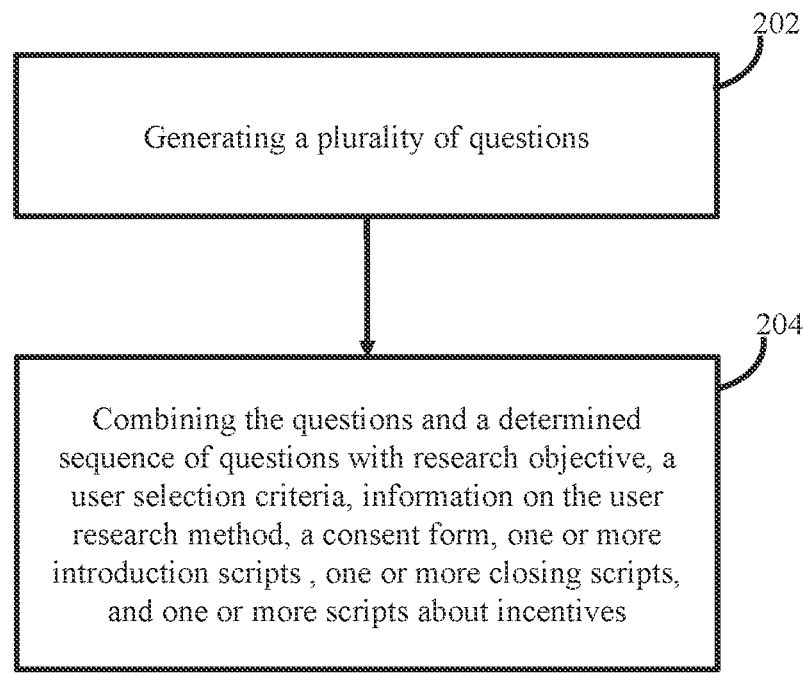
FIG. 2 is a flow diagram depicting steps involved in the process of performing the protocol generation, using the system of FIG. 1, according to some embodiments of the present disclosure.

FIG. 2 is a flow diagram depicting steps involved in the process of performing the protocol generation, using the system of FIG. 1, according to some embodiments of the present disclosure.

Figure 3:
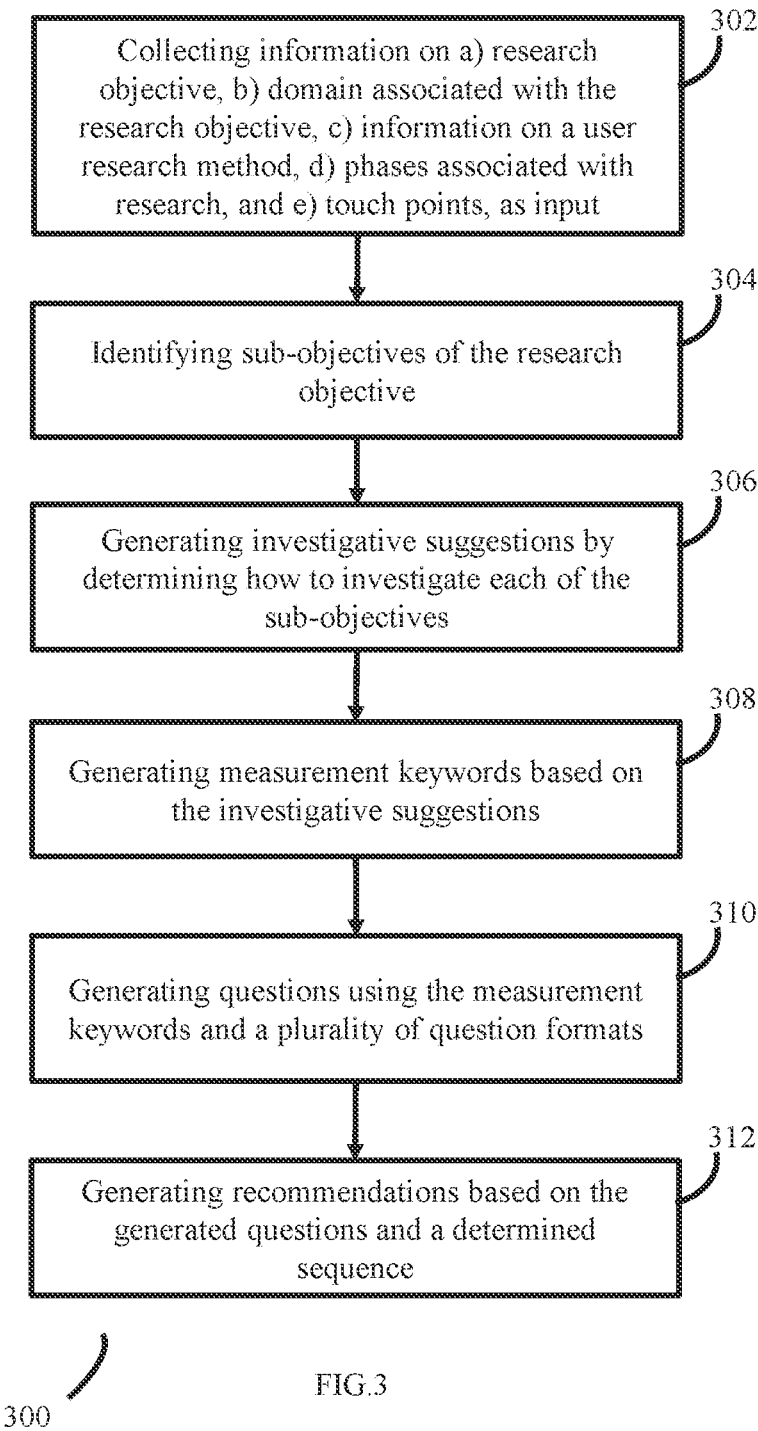
FIG. 3 is a flow diagram depicting steps involved in the process of generating a plurality of questions, using the system of FIG. 1, according to some embodiments of the present disclosure.
Figure 4:
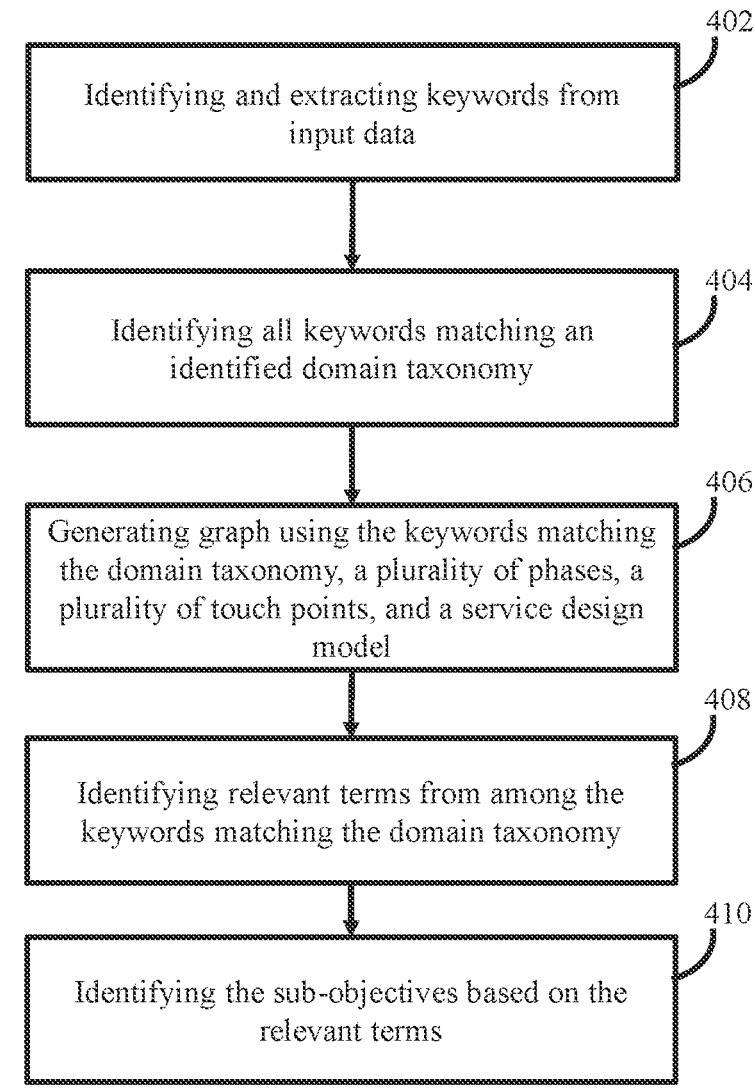
FIG. 4 is a flow diagram depicting steps involved in the process of identifying sub-objectives corresponding to a research objective, using the system of FIG. 1, in accordance with some embodiments of the present disclosure.

The protocol generation broadly involves two steps. At step 202, the system 100 generates a plurality of questions. Various steps involved in the process of generating the questions are depicted in FIG. 3, and are explained here. Each evaluation or research has specific objectives. So the questions are to be generated to collect response which meets the objectives.

Initially, at step 302, the system 100 collects information on a) research objective, b) domain associated with the research objective, c) information on a user research method, d) phases associated with research, and e) touchpoints, as input. The phases collected as input vary based on the service under consideration, and represent different stages a user has to go through to meet the objective. For example, if the service under consideration is a learning service, then the various phases maybe, but not limited to, search for the service 4 register 4 attend classes 4 evaluation 4 certificate 4 job search support. Similarly, from a service point of view, the touchpoints may be learning website, online faculty, point of contact at the institute and so on. The research objective may be, for example, 'Understanding learner's experience of ABC learning courses'. The domain in this scenario is 'Education/learning'. In an embodiment, the inputs are fed to the system 100 via the communication interface 103, by an authorized user of the system 100. In another embodiment, the system 100 extracts the input data from one or more documents which contain objective, and related information on the evaluation/research being carried out.

At step 304, the system 100 identifies all sub-objectives of the research objectives. Various steps involved in the process of identifying the sub-objectives are depicted in the flow diagram in FIG. 4, and in the example diagram in FIG. 8. At step 402, the system 100, by processing the input data, identifies a plurality of keywords. The system 100 then identifies a domain taxonomy (or 'ontology') that matches domain in which the evaluation/assessment is being carried out. Further, at step 404, the system 100 compares the keywords identified at step 302 with the identified domain taxonomy, and identifies all keywords matching the identified domain taxonomy. The system 100, at step 406, generates a graph by processing the domain keywords, the domain taxonomy, the service design model, the touchpoints, and the phases. Further, at step 408, the system 100 processes the graph using a graph processing technique, and identifies a subset of the plurality of keywords matching the domain taxonomy as relevant terms, along with a calculated relevance score, wherein the relevance score of each of the keywords indicates/represents extent of relevance. At step 410, the system 100 identifies the sub-objectives from among the keywords identified as the relevant terms. At this step, the system 100 may compare the relevance score of each of the relevant keywords with a threshold of relevance and the keywords for which the calculated value of relevance score exceeds the threshold of relevance are identified as the sub-objectives.

Figure 5:
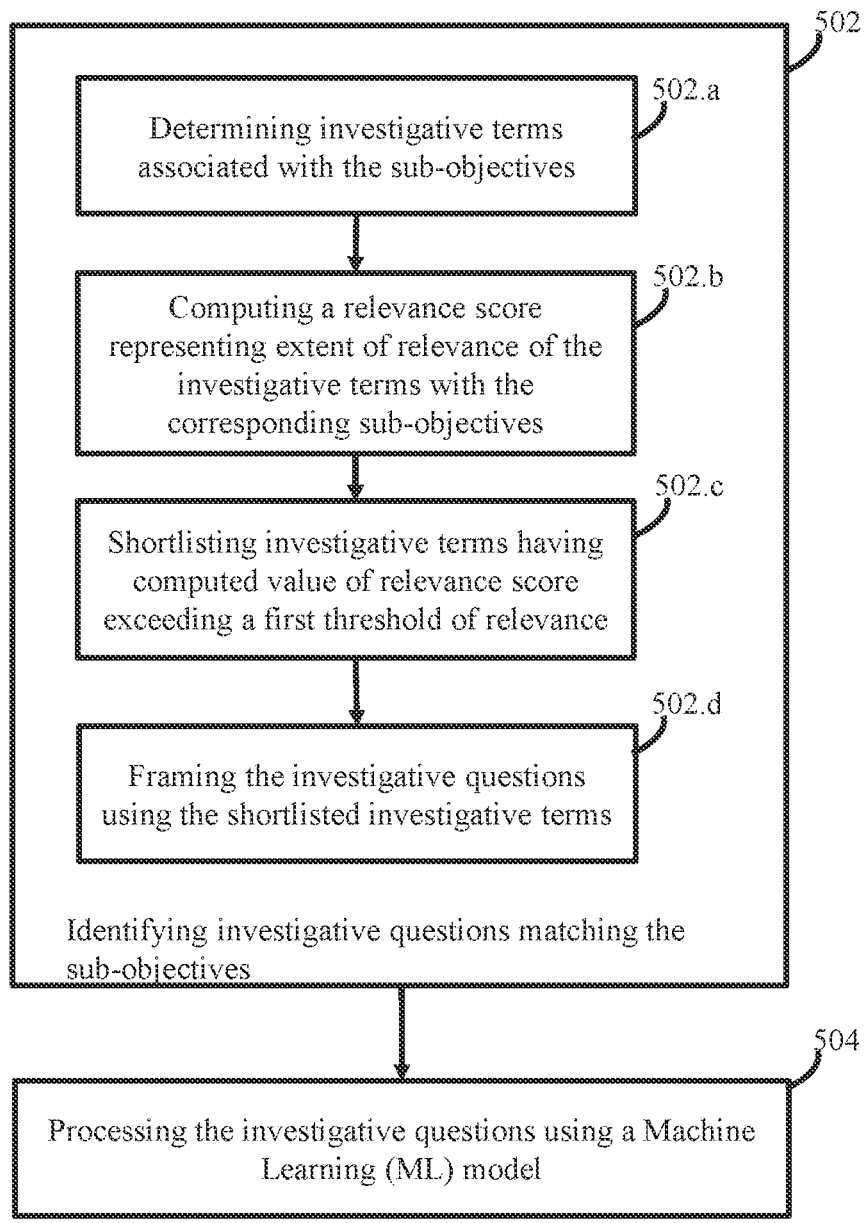
FIG. 5 is a flow diagram depicting steps involved in the process of identifying investigative questions matching the sub-objectives, using the system of FIG. 1, in accordance with some embodiments of the present disclosure.

Further, at step 306, the system 100 determines a plurality of investigative suggestions, wherein the investigative suggestions suggest to the user how to investigate each of the objectives and sub-objectives, so as to get expected data as response. Steps involved in the process of determining the investigative suggestions are depicted in FIG. 5. At step 502 the system 100 identifies a plurality of investigative questions matching the plurality of sub-objectives. Identification of the plurality of investigative questions involves the following sub-steps. The system 100 initially determines one or more investigative terms associated with each of the plurality of sub-objectives, at step 502.a. The system 100 may determine the one or more investigative terms based on a pre-defined mapping between the investigative terms and the sub-objectives. Further, at step 502.b, a relevance score representing extent of relevance of the one or more investigative terms with corresponding sub-objectives is determined. The relevance score is then compared with a first threshold of relevance, at step 502.c, and all the investigative terms having the computed value of relevance score exceeding the first threshold of relevance are shortlisted. Further, a plurality of investigative questions are framed at step 502.d using the shortlisted investigative terms. Once the plurality of investigative questions are identified, then they are processed using a Machine Learning (ML) model to generate the investigative suggestions, at step 504.

Figure 6:
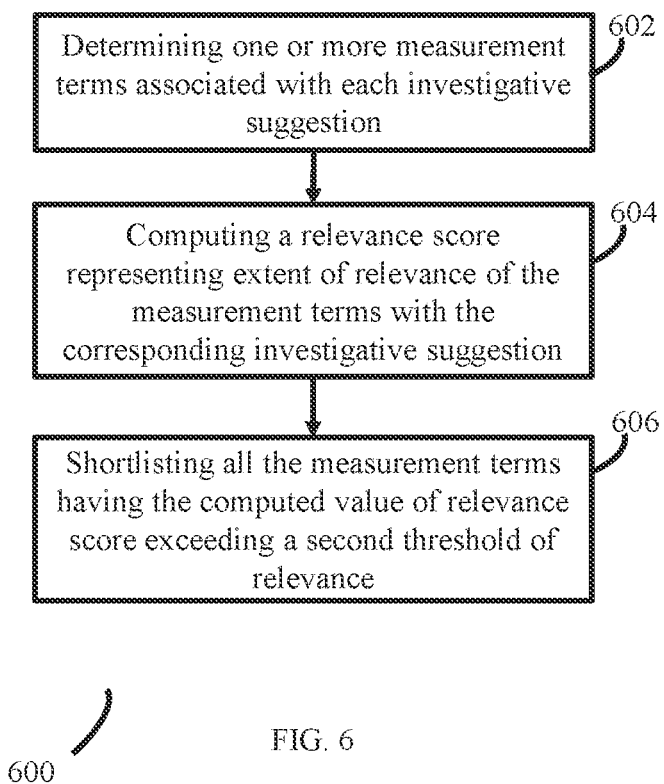
FIG. 6 is a flow diagram depicting steps involved in the process of generating measurement keywords based on the investigative suggestions, using the system of FIG. 1, in accordance with some embodiments of the present disclosure.
Figure 7:
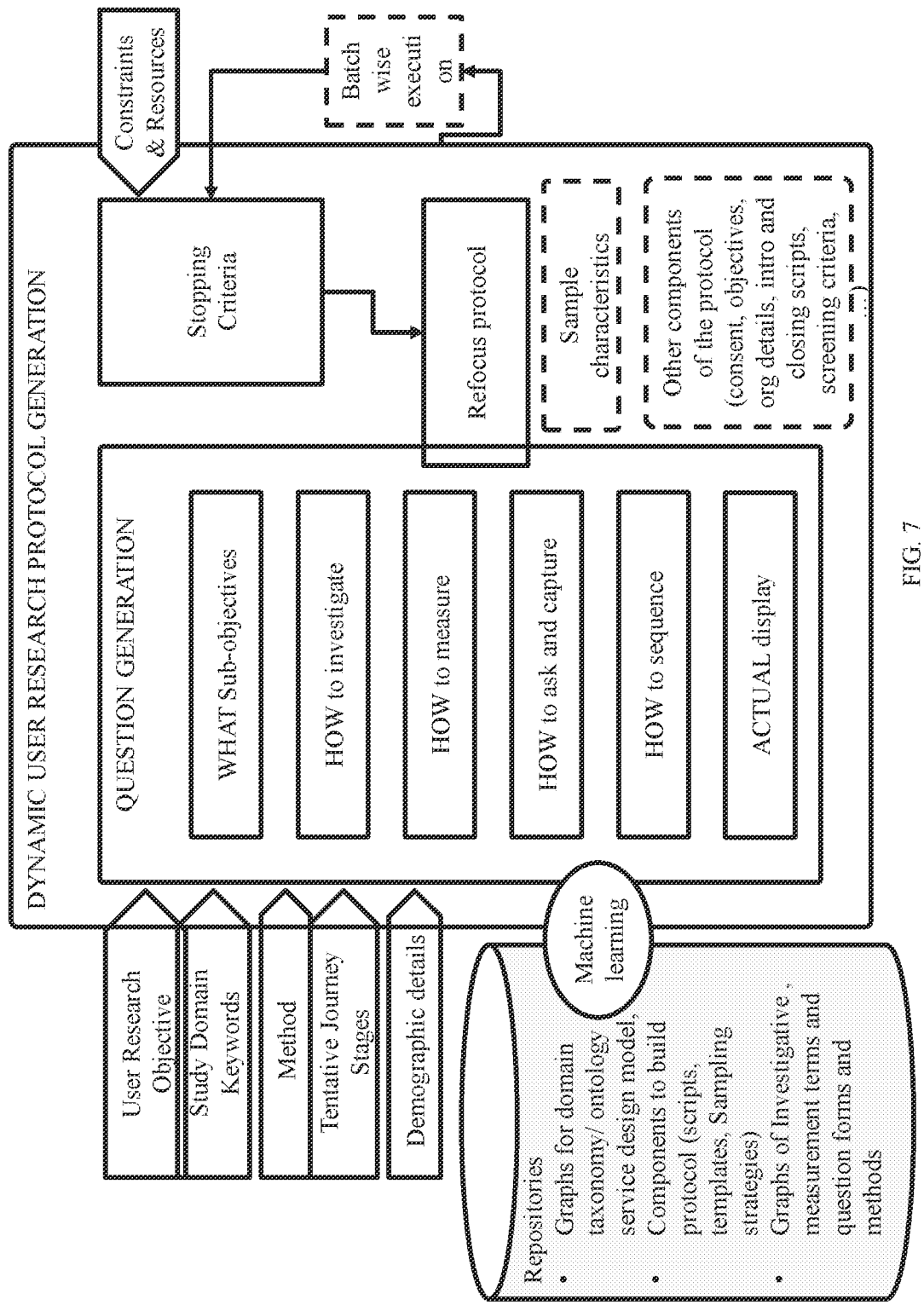
FIG. 7 depicts an example implementation of the system of FIG. 1, in accordance with some embodiments of the present disclosure.
Figure 8:
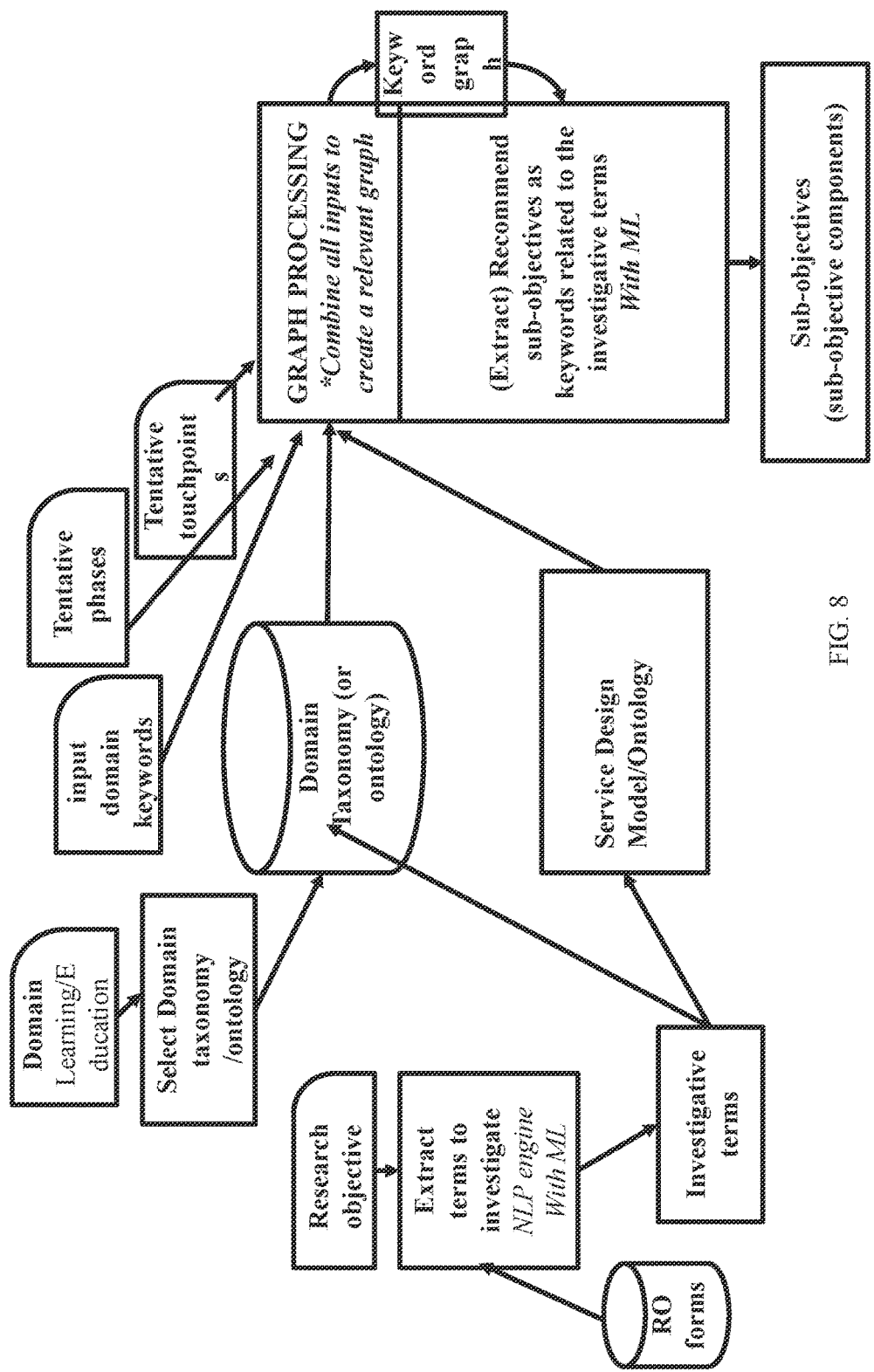
FIG. 8 depicts an example diagram depicting steps involved in the process of identifying sub-objectives corresponding to a research objective, using the system of FIG. 1, in accordance with some embodiments of the present disclosure.

The following example (Example. 1) covers the process 500. A set of sub-objectives e.g. "experience" "touchpoint i=ABC learning website" "stage i=registration" put together in aspect+stage+touchpoint format are converted into the following investigative questions:
e.g. "How to investigate "experience" for "ABC learning website" for during "registration"?"
and then for the investigative questions the following investigative suggestions are created:
Ease of registration/Challenges/difficulties during registration
What they liked during registration on website
Completeness of info for registration on website
Support/help required during registration Further, at step 308, the system 100 generates a plurality of measurement keywords (also referred to as 'measurement terms') based on the investigative suggestions. The measurement keywords help to understand how certain parameters associated with the investigative suggestions can be measured. For example, consider that "ease of registration/challenges/difficulties during registration" is one of the investigative suggestions. The system 100 processes this investigative suggestion and determines that measurement keywords such as but not limited to "errors, completion, usability, availability of information, time and effort taken" can help measure the aforementioned investigative suggestion. Similarly, if the investigative suggestion is "what users liked during registration", the system 100 may identify "speed, aesthetics, pricing, interface, simplicity, and so on" as the measurement keywords. Steps involved in the process of generating the measurement keywords, by the system 100, are depicted in FIG. 6. The system 100 identified the measurement keywords based on investigative terms that form the investigative suggestions at step 306.

The system 100 generates the plurality of measurement keywords by extracting the measurement keywords from the plurality of investigative suggestions, a demographic data, and the keywords, using a ML model. At step 602, the system 100 determines one or more measurement terms associated with each of the investigative suggestions. The system 100 may determine the measurement terms based on contents of a reference database i.e. the reference database may contain a plurality of terms/keywords that are listed as the measurement keywords, and all matching terms associated with the investigative suggestions are determined as the measurement keywords. The system 100 then computes at step 604, a relevance score representing extent of relevance of the one or more measurement terms with corresponding investigative suggestions. Further, all measurement terms having the computed value of relevance score exceeding a second threshold of relevance are identified as the measurement keywords to be processed further, at step 606.

The measurement terms are alternatively referred to as "measurement keywords". In an embodiment, the system 100 may use demographic information as an additional input for generating the measurement terms. Further, the demographic details may help in bringing in variation in the investigative aspect captured as per the demographic variation. For example, some segments of user being assessed may have additional/less terms suggested to investigate. Therefore, there may be subsets of keywords which are applicable only to some segments of users. By using such demographic details as input for generating the measurement keywords, the system 100 is able to fine-tune the measurement keywords.

Further at step 310, the system 100 generates questions, using the selected measurement keywords, and a plurality of formats of questions (also referred to as "question formats"). At this step, the system 100 determines which question format is most suitable for the selected measurement keywords and the research objective. Some examples of the question formats are, but not limited to, objective type questions, true-false questions, and elaborative type question. Further, the system 100 formats the measurement keywords based on the question format that has been determined as the most suitable one, to generate the questions. Steps involved in selection of the question format are explained below:

The system 100 may maintain a reference database of different forms/formats of questions, such that these formats cover different types of data such as but not limited to qualitative, quantitative, descriptive, comparative, relationship-based, exploratory, predictive, and interpretive. A few examples of question formats are, but not limited to:

What is _____
What is your impression about _____
What do you think about _____
What would
What do you feel about
How do you do
What are the
What was
Do you feel that
In what way
Are people more likely
Would people/you
How often do
How do
What percentage
How many/much
Which _____ is more
How does _____ lead to/influence/synonyms to
Why do you The measurement terms may also have some additional qualification along with the terms so that complete questions can be formed e.g. error 'faced', 'number of' errors, errors 'prevented', and so on. The system 100 selects a measurement term and chooses one of the question formats. The selection of question format may be in terms of a pre-configured preference, or based on historical information on formats previously used. In another embodiment, each question format can have different weightages, and the system 100 may choose the question format(s) having highest value of weightage. Example of selection of question formats based on the weightages is given below:

For the measurement term "Error", the following formats may be available as options.
i. "How many" "errors" "did you face" "on the website" "during registration"
ii. What" "errors" "did you face . . . ?
iii. "What was the most significant" error.
iv. What errors did you face during registration on the website? a) _____ b) _____ c) _____ d) _____
v. I faced errors that made registration difficult—strongly disagree to strongly agree
vi. What were the difficulties you faced during registration?
What kind of errors did you face? Did you manage to complete it successfully in one go? Did you face usability challenges . . .
vii. Observation checklist—observe the user registering on the website:

viii. Check for 1) errors that the user faces
   a. 2) issues in completing the task
   b. 3) usability problems
   c. etc.

Based on weights the format may be selected as, for example:
  a) Observation—form vii (from the aforementioned list)
  b) interviews—ii, iii, vi
    where vi is most likely as it is more open ended—for a method like semi-structured interview, contextual interview) iii may be more appropriate for an interview method where we are using a Critical Incident technique.
  c) Survey method—i, iii (but open ended), iv, v
  Additionally, the investigative question may be used as an initial open-ended question followed by using the measurement terms for more specific questions (as in vi in example).
  As an example:
    Investigative Question: How to measure "difficulties faced during registration on website".
    Measurement terms: "errors, completion, usability, availability of information, . . . time and effort taken, find help/support".
    Available formats:
      I am satisfied with the _____ (strongly disagree, disagree, neither disagree/agree, agree, strongly agree(
      I would recommend _____ (strongly disagree, disagree, neither disagree/agree, agree, strongly agree(
    Main and sub-questions
      IQ
        Sub-Q made of investigative terms
    Keywords for (observations)
      IQ, and Investigative terms as a sentence Further, at step 312, the system 100 generates recommendations to the user. Generating the recommendations involves a) determining a sequence of questions, b) arranging the questions as per the determined sequence, and c) presenting the questions in the sequence to the user. The system 100 may perform grouping of the questions based on one or more pre-defined conditions. For example, the grouping of questions may be based on one a) service the questions are related to, b) touchpoint the questions are related to, c) aspect the questions are related to, and so on. If the groups maybe arranged based on application. For example, if the application is service design, then the groups may be arranged service stage-wise.

After generating the questions, at step 204, the system 100 generates a User Research protocol (alternately referred to as "research protocol" or "protocol") by combining the questions and the determined sequence of steps with a plurality of secondary information. The secondary information may include data such as but not limited to the research objectives, screening/user selection criteria, method of research, consent form, introduction scripts (that the researcher speaks before asking questions), the questions, closing scripts, and scripts about incentives. In an embodiment, the secondary information on various parameters that form the secondary information are collected as input by the system 100.

Responses that may be provided by the user in response to the questions generated via the method 300 may be used for generating and/or updating the protocol. It is to be noted that the process of generating the questions in method 300 has been explained in the context of user research protocol generation, and the user research protocol may have a variety of applications such as but not limited to user evaluation for interviews, for understanding customer preferences, and so on.

The user may provide responses to each of the questions, and the system 100 collects the responses using a suitable interface. The collected responses may be stored for further analysis/review, in an appropriate database in the memory 101. In an embodiment, the system 100 dynamically analyzes the collected response and automatically triggers response collection when a saturation is reached. In various embodiments, the system 100 estimates the saturation in terms of at least one of a demographic saturation and a data saturation. When both the demographic saturation and the data saturation are achieved/met, the system 100 generates a trigger to terminate/stop the data/response collection from the user. If only one of the demographic saturation and the data saturation has been identified to have been met, then the protocol is updated to focus the data collection accordingly. This process is elaborated below:

Let $C_{sat}$ be a content saturation score, and $D_{sat}$ be demographic saturation score. Calculation of $C_{sat}$ and $D_{sat}$ are explained below:

Computation of $C_{sat}$:
Saturation score for "clustering by topic"=$M_1$ . . . Weight=$W_1$
Saturation score for "word cloud"=$M_2$ . . . Weight=$W_2$
Saturation score for "summarization"=$M_3$ Weight=$W_3$
. . .
Saturation score for "method n"=$M_n$ . . . Weight=$W_n$ $$C_{sat}=(M_1*W_1=M_2*W_2+M_3*W_3+\ldots M_n*W_n)/\text{sum}(W_i)$$

Value of $T_{csat}$ may be configurable as per requirements.
If ($C_{sat}>T_{csat}$) is $C_{sat}$=true else is $C_{sat}$=false
Computation of $D_{sat}$:
Let S by a set of segments
$S=\{S_1, S_2, S_3, \ldots Sn\}$
Segment Si is a unique combination of different demographic parameters that define different types of people. For example, $S_1$=Male child of 10-15 years Schooling in Maharashtra, and $nS_1$ is the number people interviewed satisfying this criteria.
$D_{sat}$ score is the actual coverage of each segment $D_{sat}$Set=$\{nS_1, nS_2, nS_3 \ldots nSn\}$
Threshold $Td_{sat}$ is achieved if
$nS_1>=tS_1, nS_2>=tS_1, nS_3>=tS_3 \ldots nS_i>tS_i$
Computing M1 (Saturation Score)
$0=<M1<=1$
Let X be the max number of clusters. X is considered to have a high value for example purpose
The complete set of clusters is $C=\{C_1, C_2, C_3 \ldots C_X\}$
Batch i contains Ni responses to the given question Qi.
Let Responses for Batch i be $R_i=\{r_1, r_2, r_3, \ldots rN_i\}$
Break down the responses into Mi usable units:
Response units $RU_i=\{ru_1, ru_2, ru_3, \ldots ruM_i\}$
The response units are input to the clustering algorithm giving the following clusters which are added to the Set C.
Depending on the iteration i, some clusters may not have any content yet
Each $C_x$ is a set of Response units and contains response units from all batches
In each iteration, give a probability score to each cluster if there were response units added in this cycle: $C_{score}=\{C_{1s}, C_{2s}, C_{3s}, \ldots C_{Xs}\}$//distribution
Compute saturation score of iteration i . . . i.e. the level of scatteredness of data.

$C_{sat-i}$=(computation comparing delta with previous distributions) i.e. the probability scores of each $C_x$ seems to have stabilized The $C_x$ with high probabilities are the main clusters where p % of response units fit in and rest (100-p) % fits in the other clusters—e.g. p=80.

Computing M1 (Saturation Score for Clustering Method)
0=<M1<=1 - - - 0 means no saturation 1 means complete saturation
Batch i to n
Let no of clusters for algorithm be X
Let no of keyword terms in cluster name by Y
E.g: X=5 and Y=4
For iteration 1:
$C_1$=a_b_c_d; C2=e_f_g_a; C3=a_d_p_q; C4=l_m_n_o; C5=p_q_r_s
For each iteration this may change//but there may be similarities with previous iteration
For each iteration we compute similarity index to the previous iteration ($M1_i$)
All responses are clustered in each iteration to form response units
The clusters of batch i with clusters of batch i−1, based on how similar the terms are

---

$M1_i$ = $Sum_j$(noOfTermsSimilar($C_{ji}$, $C_{ji-1}$)/Y)/X ..... i=1 to n; j=1 to X
If $M1_i$ = $M1_{i-1}$ for T cycles – stop
$M_1$ = The final $M1_i$

| INPUT | CLUSTERING (2 clusters) |
|---|---|
| (rain, umbrella, gumboots) | (rain) (umbrella, gumboots) |
| (rain, umbrella) | (rain) (umbrella, gumboots) |
| (rain, wet) | (rain, wet) (umbrella, gumboots) |
| (soaked, raincoat) | (rain, wet, soaked) (umbrella, gumboots, raincoat) |
| (sandals, rain, blue) | (rain, wet, soaked, blue) (umbrella, gumboots, raincoat, sandals) |

---

Computing M2 (Saturation Score for Word Cloud)
0=<M2<=1
For each batch i (batch size=1), a word cloud $W_{Ci}$ is generated.
$W_{Ci}$={($term_1$, $freq_1$), ($term_2$, $freq_2$), . . . ($term_N$, $freq_N$)}
$WC_{new}$=$WC_{old}$+$WC_i$
Compare $WC_{new}$ and $WC_{old}$
$M_2$=Similarity index between $WC_{new}$ & $WC_{old}$
e.g. M2=(how many terms are in the same order—how many terms have shifted—how many terms are added)/number of terms
Wrt
  New terms added
  Consider synonyms and related words together
  Frequency distribution//ordered sequence is changing?
$WC_{old}$=$WC_{new}$
i++
Computing M3 (Summarizer)
0=<M3<=1
For each batch i
For each response $R_j$ extract the best connected sentence (semantically)=$S_{ij}$
Make clusters for the batch
Each cluster can be shown as a graph (wrt to how the summary sentence was identified)
Similarity Index In various embodiments, the system 100 may determine the saturation level at sub protocol levels. Here, determining the saturation level at the sub-protocol level may mean assessing saturation level separately at the demographic level or the content level. In another embodiment, the sub-level may refer to individual question level. For example, the system 100 analyzes the geographic saturation and the content saturation separately, and upon determining that the responses collected has reached the content saturation or the demographic saturation, related questions may be dropped, so as to improve focus on areas which haven't reached saturation. Similarly, when the saturation is determined at individual question level, the system 100 separately checks saturation of responses collected to each question, and if responses to any of the questions have been determined to have reached the set saturation levels, that particular question is dropped, so that the focus can be on questions which haven't met the saturation. By dropping one or more of the questions, the protocol is dynamically updated. In another embodiment, the system may determine saturation at a user level i.e. whether a user has provided data that has reached a defined saturation level. The protocol updation may also be performed by dynamically deciding to drop a set/segment of users. For example, if response from users of a particular age group has reached the set saturation levels, then that particular group of users may be excluded from further assessments. The one or more users being dropped as part of the user research protocol updation is also referred to as 'user segments'. In an alternate embodiment, upon detecting that a current set of users are not able to provide required information, determined in terms of the content and/or geographic saturation, within a specific time limit, recommendations to add more users may be generated, wherein the change in number of users also amounts to protocol updation.

The system 100 may be configured to select various actions directed to the protocol updation, based on a plurality of conditions pre-defined and configured with the system 100. The decision making and the corresponding actions are depicted in Table. 1.

TABLE 1

| Is Dsat? | Is Csat? | Is Saturation? | Action |
|---|---|---|---|
| T | T | T | Terminate data collection |
| T | F | F | Continue data collection, update the user research protocol to focus on content specific questions |
| F | T | F | Continue data collection, update the user research protocol to focus on Demography specific questions |
| F | F | F | Continue data collection |

As in Table. 1, if both content saturation as well as demographic saturation have been met, then the data collection is terminated. If only the demographic saturation is met, then the data collection is continued by updating the user research protocol to improve focus on content specific questions. If only the content saturation is met, then the data collection is continued by updating the user research protocol to improve focus on demography specific questions. If both the demographic saturation and the content saturation are not met, then the data collection is continued, and in this scenario the user research protocol updation may be optional. As the questions or the user segments are being dropped as part of the user research protocol updation, in turn overall effort in performing the assessment and data collection also is reducing.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of automated protocol generation for research and evaluation. The embodiment, thus provides a mechanism to automatically recommend questions that match an identified research objective and corresponding sub-objectives. Moreover, the embodiments herein further provide a method and system for triggering termination of data collection based on a calculated saturation value.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of protocol generation, comprising:
   generating a plurality of questions, comprising:
      collecting information on a) a research objective of a research being carried out, b) domain associated with the research objective, c) information on a user research method, d) a plurality of phases associated with a service under consideration, and e) a plurality of touchpoints, as input, via one or more hardware processors;
      identifying sub-objectives matching the research objective, via the one or more hardware processors;
      generating a plurality of investigative suggestions by determining how to investigate each of the sub-objectives, via the one or more hardware processors, by:
         identifying a plurality of investigative questions matching the plurality of sub-objectives, comprising:
            determining one or more investigative terms associated with each of the plurality of sub-objectives;
            computing a relevance score representing extent of relevance of the one or more investigative terms with corresponding sub-objectives;
            shortlisting all investigative terms having the computed value of relevance score exceeding a first threshold of relevance;
            framing the plurality of investigative questions using the shortlisted investigative terms; and
            processing the plurality of investigative questions using a Machine Learning (ML) model;
      generating a plurality of measurement keywords based on the plurality of investigative suggestions, via the one or more hardware processors, wherein the measurement keywords are fine-tuned to identify subsets of the measurement keywords that are applicable to a segments of user's based on demographic details;

generating a plurality of questions using the measurement keywords and a plurality of question formats, via the one or more hardware processors, wherein generating the plurality of questions comprises formatting a plurality of measurement terms in the plurality of measurement keywords into one or more pre-defined question forms, based on contents of a reference database and the user research method; and generating recommendations based on the plurality of questions and a determined sequence, via the one or more hardware processors;

generating a user research protocol by combining the generated recommendation on the plurality of questions and the determined sequence with the research objective, a user selection criteria, information on the user research method, a consent form, one or more introduction scripts, one or more closing scripts, and one or more scripts about incentives;

collecting data of a response provided by a user to the plurality of questions generated as the recommendations, wherein the data is collected in at least one mode comprising at least one of an audio, video, and text, and wherein the data is stored in a database;

generating a trigger to terminate the collection of data from the user by dynamically analyzing the response to determine a stoppage criteria, wherein the stoppage criteria defines saturation in terms of at least one of a demographic saturation and content saturation, wherein the content saturation and the demographic saturation is derived using a content saturation score ($C_{sat}$) and a demographic saturation score ($D_{sat}$) respectively, wherein $C_{sat}$ is computed using:

$$C_{sat}=(M1*W1+M2*W2+M3*W3+\ldots Mn*Wn)/\text{sum}(Wi)$$

where Mn is a saturation score and Wn is weight or "method n", wherein a value of content saturation threshold ($T_{csat}$) is configurable as per requirements, and if $C_{sat} > T_{csat}$ then $C_{sat}$=true else $C_{sat}$=false, and wherein $D_{sat}$ is computed using:

$$D_{sat}\text{Set}=\{nS1, nS2, nS3 \ldots nSn\}$$

where a set of segments S={S1, S2, S3, ... Sn}, and segment Si is a unique combination of demographic parameters that define types of people, and nSi is the number people interviewed satisfying the segment Si, wherein $D_{sat}$ is actual coverage of each of the segment, and a value of demographic saturation threshold ($T_{dsat}$) is achieved if nS1 >=tS1, nS2 >=tS1, nS3 >=tS3 . . . . nSi>tSi; and dynamically updating the user research protocol, if only one of the demographic saturation and the content saturation is achieved, by:

determining a saturation at a sub-protocol level, from among a plurality of sub-protocol levels present in the user research protocol; and dropping at least one of a question, or a user segment, or changing number of users in the user segment, based on the determined saturation at the sub-protocol level, wherein the user research protocol is updated to continue data collection and focus on content specific questions or demography specific questions.

2. The method as claimed in claim 1, wherein identifying the sub-objectives comprises:

identifying and extracting a plurality of keywords from the input data;

identifying all keywords that match an identified domain taxonomy of the keywords;

generating a graph using the keywords matching the domain taxonomy, the plurality of phases, the plurality of touchpoints, and a service design model; and identifying a plurality of relevant terms from among the plurality of keywords matching the domain taxonomy, by processing the graph using a graph processing technique; and identifying the sub-objectives based on the plurality of relevant terms.

3. The method as claimed in claim 1, wherein generating the plurality of measurement keywords, comprises extracting the measurement keywords by processing the plurality of investigative suggestions, a demographic data, and the keywords, using a ML model, wherein extracting the measurement terms comprises:

determining one or more measurement terms associated with each of the investigative suggestions;

computing a relevance score representing extent of relevance of the one or more measurement terms with corresponding investigative suggestions; and shortlisting all measurement terms having the computed value of relevance score exceeding a second threshold of relevance.

4. The method as claimed in claim 1, wherein generating the plurality of questions comprises determining how to ask each of the plurality of questions, by:

determining the at least one mode in which the response to the questions are to be captured.

5. The method as claimed in claim 1, wherein determining the sequence comprises sequencing the plurality of questions using at least one of a) journey stage wise sequencing, b) touchpoint wise sequencing, and c) research objective wise sequencing.

6. A system for protocol generation, comprising:

one or more hardware processors;

a communication interface; and a memory storing a plurality of instructions, wherein the plurality of instructions when executed, cause the one or more hardware processors to:

generate a plurality of questions, by:

collecting information on a) a research objective of a research being carried out, b) domain associated with the research objective, c) information on a user research method, d) a plurality of phases associated with a service under consideration, and e) a plurality of touchpoints, as input, via one or more hardware processors;

identifying sub-objectives matching the research objective, via the one or more hardware processors;

generating a plurality of investigative suggestions by determining how to investigate each of the sub-objectives, via the one or more hardware processors by:

identifying a plurality of investigative questions matching the plurality of sub-objectives, comprising:

determining one or more investigative terms associated with each of the plurality of sub-objectives;

computing a relevance score representing extent of relevance of the one or more investigative terms with corresponding sub-objectives;

shortlisting all investigative terms having the computed value of relevance score exceeding a first threshold of relevance;

framing the plurality of investigative questions using the shortlisted investigative terms; and processing the plurality of investigative questions using a Machine Learning (ML) model;

generating a plurality of measurement keywords based on the plurality of investigative suggestions, via the one or more hardware processors, wherein the measurement keywords are fine-tuned to identify subsets of the measurement keywords that are applicable to a segments of user's based on demographic details;

generating a plurality of questions using the measurement keywords and a plurality of question formats, via the one or more hardware processors, wherein generating the plurality of questions comprises formatting a plurality of measurement terms in the plurality of measurement keywords into one or more pre-defined question forms, based on contents of a reference database and the user research method; and generating recommendations based on the plurality of questions and a determined sequence, via the one or more hardware processors;

generate a user research protocol by combining the generated recommendation on the plurality of questions and the determined sequence with the research objective, a user selection criteria, information on the user research method, a consent form, one or more introduction scripts, one or more closing scripts, and one or more scripts about incentives;

collect data of a response provided by a user to the plurality of questions generated as the recommendations, wherein the data is collected in at least one mode comprising at least one of an audio, video, and text, and wherein the data is stored in a database;

generate a trigger to terminate the collection of data from the user by dynamically analyzing the response to determine a stoppage criteria, wherein the stoppage criteria defines saturation in terms of at least one of a demographic saturation and content saturation, wherein the content saturation and the demographic saturation is derived using a content saturation score ($C_{sat}$) and a demographic saturation score ($D_{sat}$) respectively, wherein $C_{sat}$ is computed using:

$$C_{sat}=(M1*W1+M2*W2+M3*W3+\ldots Mn*Wn)/\text{sum}(Wi)$$

where Mn is a saturation score and Wn is weight or "method n", wherein a value of content saturation threshold ($T_{csat}$) is configurable as per requirements, and if $C_{sat} > T_{csat}$ then $C_{sat}$=true else $C_{sat}$=false, and wherein $D_{sat}$ is computed using:

$$D_{sat}\text{Set}=\{nS1, nS2, nS3 \ldots nSn\}$$

where a set of segments S={S1, S2, S3 .... Sn}, and segment Si is a unique combination of demographic parameters that define types of people, and nSi is the number people interviewed satisfying the segment Si, wherein $D_{sat}$ is actual coverage of each of the segment, and a value of demographic saturation threshold ($T_{dsat}$) is achieved if nS1>=tS1, nS2 >=tS1, nS3 >=tS3 .... nSi>tSi; and dynamically update the user research protocol, if only one of the demographic saturation and the content saturation is achieved, by:

determining a saturation at a sub-protocol level, from among a plurality of sub-protocol levels present in the user research protocol; and dropping at least one of a question, or a user segment, or changing number of users in the user segment, based on the determined saturation at the sub-protocol level, wherein the user research protocol is updated to continue data collection and focus on content specific questions or demography specific questions.

7. The system as claimed in claim 6, wherein the system identifies the sub-objectives by:

identifying and extracting a plurality of keywords from the input data;

identifying all keywords that match an identified domain taxonomy of the keywords;

generating a graph using the keywords matching the domain taxonomy, the plurality of phases, the plurality of touchpoints, and a service design model; and identifying a plurality of relevant terms from among the plurality of keywords matching the domain taxonomy, by processing the graph using a graph processing technique; and identifying the sub-objectives based on the plurality of relevant terms.

8. The system as claimed in claim 6, wherein the system generates the plurality of measurement keywords by extracting the measurement keywords by processing the plurality of investigative suggestions, a demographic data, and the keywords, using a ML model, wherein extracting the measurement terms comprises:

determining one or more measurement terms associated with each of the investigative suggestions;

computing a relevance score representing extent of relevance of the one or more measurement terms with corresponding investigative suggestions; and shortlisting all measurement terms having the computed value of relevance score exceeding a second threshold of relevance.

9. The system as claimed in claim 6, wherein the system generates the plurality of questions by determining how to ask each of the plurality of questions, by:

determining the at least one mode in which the response to the questions are to be captured.

10. The system as claimed in claim 6, wherein the system determines the sequence by sequencing the plurality of questions using at least one of a) journey stage wise sequencing, b) touchpoint wise sequencing, and c) research objective wise sequencing.

11. A non-transitory computer readable medium for protocol generation, wherein the non-transitory computer readable medium comprising a plurality of instructions, which when executed, cause:

generating a plurality of questions, comprising:

collecting information on a) a research objective of a research being carried out, b) domain associated with the research objective, c) information on a user research method, d) a plurality of phases associated with a service under consideration, and e) a plurality of touchpoints, as input, via one or more hardware processors;

identifying sub-objectives matching the research objective, via the one or more hardware processors;

generating a plurality of investigative suggestions by determining how to investigate each of the sub-objectives, via the one or more hardware processors by:
  identifying a plurality of investigative questions matching the plurality of sub-objectives, comprising:
    determining one or more investigative terms associated with each of the plurality of sub-objectives;
    computing a relevance score representing extent of relevance of the one or more investigative terms with corresponding sub-objectives;
    shortlisting all investigative terms having the computed value of relevance score exceeding a first threshold of relevance;
    framing the plurality of investigative questions using the shortlisted investigative terms; and
  processing the plurality of investigative questions using a Machine Learning (ML) model;
generating a plurality of measurement keywords based on the plurality of investigative suggestions, via the one or more hardware processors, wherein the measurement keywords are fine-tuned to identify subsets of the measurement keywords that are applicable to a segments of user's based on demographic details;
generating a plurality of questions using the measurement keywords and a plurality of question formats, via the one or more hardware processors, wherein generating the plurality of questions comprises formatting a plurality of measurement terms in the plurality of measurement keywords into one or more pre-defined question forms, based on contents of a reference database and the user research method; and
generating recommendations based on the plurality of questions and a determined sequence, via the one or more hardware processors;
generating a user research protocol by combining the generated recommendation on the plurality of questions and the determined sequence with the research objective, a user selection criteria, information on the user research method, a consent form, one or more introduction scripts, one or more closing scripts, and one or more scripts about incentives;
collecting data of a response provided by a user to the plurality of questions generated as the recommendations, wherein the data is collected in at least one mode comprising at least one of an audio, video, and text, and wherein the data is stored in a database;
generating a trigger to terminate the collection of data from the user by dynamically analyzing the response to determine a stoppage criteria, wherein the stoppage criteria defines saturation in terms of at least one of a demographic saturation and content saturation, wherein the content saturation and the demographic saturation is derived using a content saturation score ($C_{sat}$) and a demographic saturation score ($D_{sat}$) respectively, wherein $C_{sat}$ is computed using:

$$C_{sat} = (M1*W1 = M2*W2 + M3*W3 + \ldots Mn*Wn)/\text{sum}(Wi)$$

where $Mn$ is a saturation score and $Wn$ is weight or "method n",
wherein a value of content saturation threshold ($T_{csat}$) is configurable as per requirements, and if $C_{sat} > T_{csat}$ then $C_{sat}$=true else $C_{sat}$=false, and
wherein $D_{sat}$ is computed using:

$$D_{sat}\text{Set} = \{nS1, nS2, nS3 \ldots nSn\}$$

where a set of segments $S = \{S1, S2, S3 \ldots Sn\}$, and segment $Si$ is a unique combination of demographic parameters that define types of people, and $nSi$ is the number people interviewed satisfying the segment $Si$, wherein $D_{sat}$ is actual coverage of each of the segment, and a value of demographic saturation threshold ($T_{dsat}$) is achieved if $nS1 >= tS1$, $nS2 >= tS1$, $nS3 >= tS3 \ldots nSi > tSi$; and
dynamically updating the user research protocol, if only one of the demographic saturation and the content saturation is achieved, by:
  determining a saturation at a sub-protocol level, from among a plurality of sub-protocol levels present in the user research protocol; and
  dropping at least one of a question, or a user segment, or changing number of users in the user segment, based on the determined saturation at the sub-protocol level,
wherein the user research protocol is updated to continue data collection and focus on content specific questions or demography specific questions.

* * * * *